July 2, 1940.　　　　P. WIEBICKE　　　　2,206,342
MOTOR VEHICLE
Filed June 12, 1939　　　　2 Sheets-Sheet 1
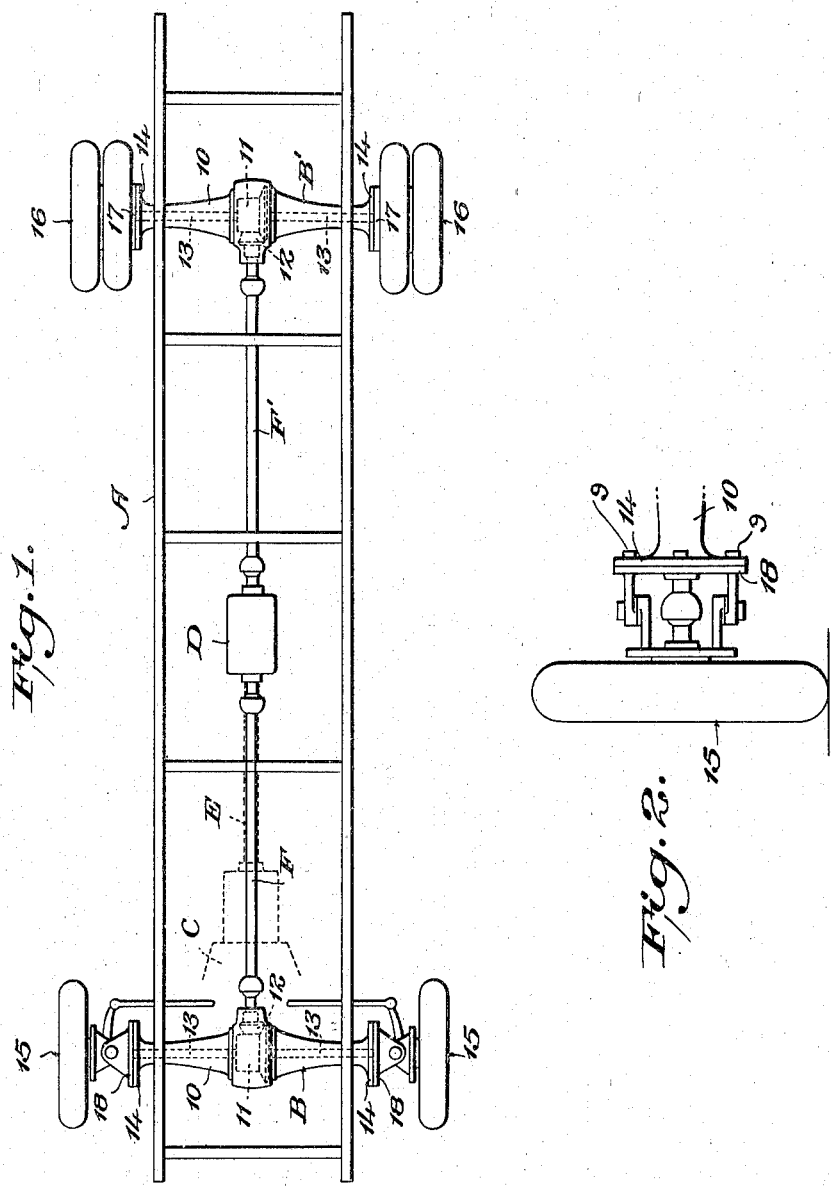
Inventor
Paul Wiebicke,
By Wolhaupter & Groff
Attorneys

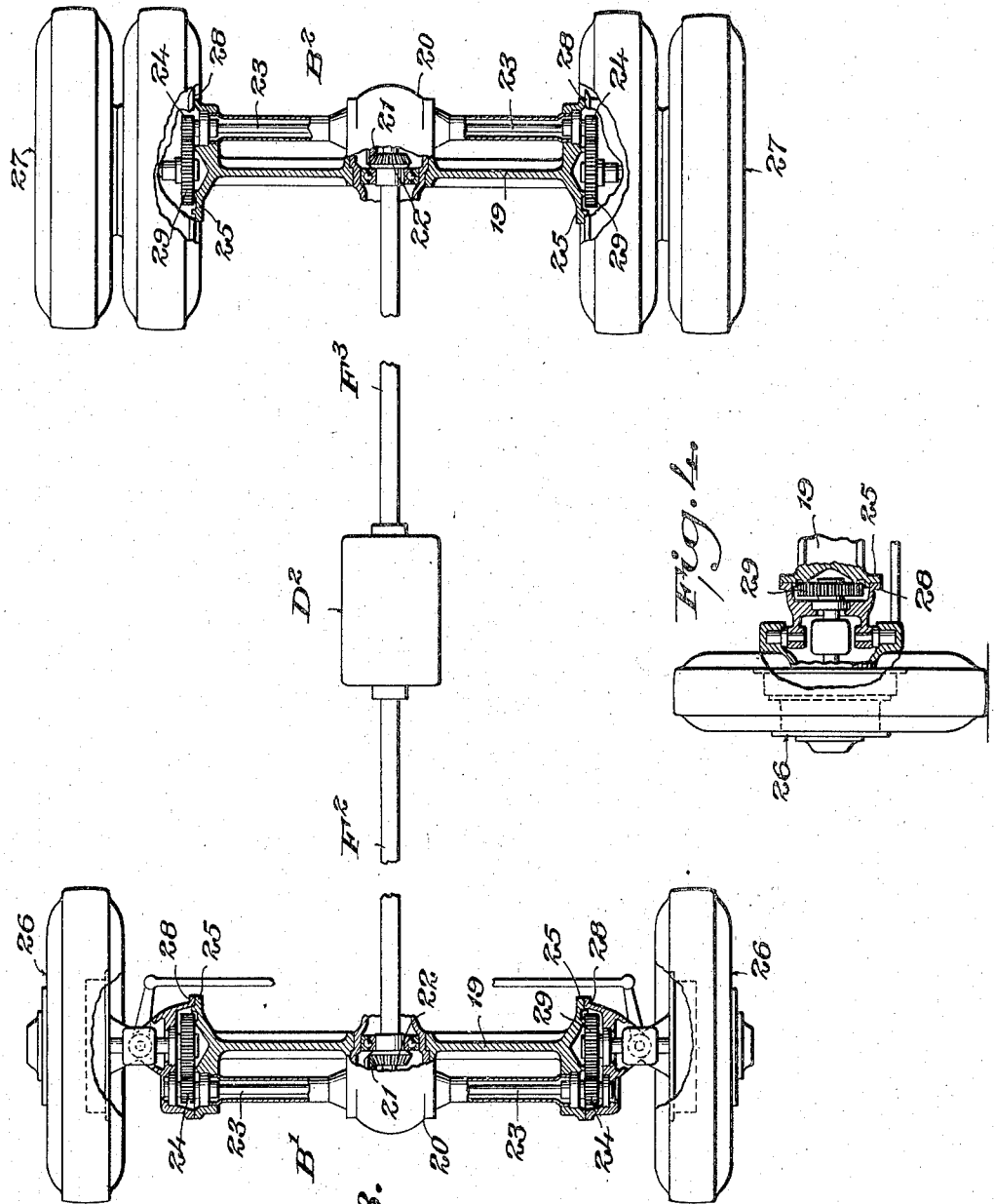

Patented July 2, 1940

2,206,342

UNITED STATES PATENT OFFICE 2,206,342

MOTOR VEHICLE

Paul Wiebicke, Nuremberg, Germany

Application June 12, 1939, Serial No. 278,757
In Germany February 1, 1939

3 Claims. (Cl. 180—49)

This invention relates to motor-driven land vehicles of the four-wheel-drive type; that is, to motor-driven land vehicles of the type in which power is applied not only to the rear wheels thereof, as is usual, but also to the front or steering wheels thereof, and has for its general object to provide, in a vehicle of this type, front and rear axle assemblies which, in main part, are duplicates of each other, whereby their production, assembly and maintenance is greatly simplified and their production, assembly and maintenance costs are very materially reduced.

With the foregoing general object in view, the invention consists in the novel features of construction, combination and arrangement of parts as will be hereinafter more fully described, illustrated in the accompanying drawings and defined in the appended claims.

In the accompanying drawings, wherein like characters of reference denote corresponding parts in related views:

Fig. 1 is a plan view of the chassis of a motor-driven land vehicle having duplicate front and rear axle assemblies in accordance with one practical embodiment of the invention.

Fig. 2 is a front elevation of one of the front wheel units and the related end portion of the axle assembly of the Fig. 1 form of the invention.

Fig. 3 is a view similar to Fig. 1 illustrating duplicate front and rear axle assemblies constructed in accordance with another practical embodiment of the invention; and Fig. 4 is a front elevation of one of the front wheel units and the related end portions of the axle assembly of the Fig. 3 form of the invention.

Referring to the drawings in detail, first with particular reference to the embodiment of the invention illustrated in Figs. 1 and 2, A designates a vehicle frame; B and B' designate, generally and respectively, front and rear axle assemblies which may be mounted on the frame A in any suitable manner; C indicates by dotted lines the motor of the vehicle; D designates, generally, a transmission gear located between the axle assemblies B and B'; E designates a shaft connecting the motor C with the transmission gear D; and F, F' designate drive shafts extending from the transmission gear D to the front and rear axle assemblies, respectively.

Each axle assembly B and B' includes a casing 10; a differential gearing 11 of known or any desired type mounted in said casing 10 centrally thereof or at any other desired point; a drive pinion 12 in driving relationship to the differential gearing 11; and shafts 13, 13, extending from the differential gearing 11 through opposite side portions of the casing 10, respectively, for connection with the wheels to be driven. These are the main parts of each of the axle assemblies B and B' and, as will be noted by reference to the drawings, said axle assemblies B and B', insofar as concerns said parts, are exact duplicates of one another. Therefore they may be used interchangeably. Accordingly, and for obvious reasons, production, assembly and maintenance of the assemblies B, B' is greatly simplified as compared with assemblies which structurally differ from one another and, at the same time, production, assembly and maintenance costs are very materially reduced.

The casings 10 are flanged at their outer ends as indicated at 14, with flanges which as shown are preferably flat and lie in a vertical plane, and through the instrumentality of said flanges either front steering wheel units 15 or rear wheel units 16 may be mounted on the ends of the casing 10 of any given axle assembly.

A rear wheel unit 16 for use with one of the present axle assemblies may be of any suitable or desired specific construction, but includes, essentially, a flange 17 or its equivalent to be mated with and bolted to a flange 14 of the casing 10 of a present axle assembly for the purpose of operatively mounting the wheel unit on the axle assembly.

A front wheel unit 15 for use with one of the present axle assemblies may likewise be of any suitable or desired specific construction, but, as in the case of a rear wheel unit, includes essentially, a flange 18 or its equivalent to be mated with and bolted as by bolts 9 to a flange 14 of the casing 10 of a present axle assembly for the purpose of operatively mounting the wheel unit on the assembly.

As distinguished from a rear wheel unit 16, a front wheel unit 15 includes parts suitably pivotally connected together to permit angular steering movements of the wheel thereof and transmission of power to the wheel from the associated axle shaft. In this connection, since the details of construction of the wheel units 15 and 16 whereby driving connections between the wheels thereof and the shafts 13 may be effected, are relatively unimportant and may be considerably varied insofar as concerns the present invention which is directed primarily to providing front and rear axle assemblies which, in main part, are duplicates of each other, it has been deemed unnecessary to illustrate said wheel units in more detail than the conventional front wheel unit illustration in Fig. 2. Obviously, since there is a driving connection from the transmission gear D to both the front and the rear axle assemblies, the front wheels as well as the rear wheels are driven.

Referring now particularly to the embodiment of the invention illustrated in Figs. 3 and 4 of the drawings, $B^1$ and $B^2$ designate, generally and respectively, the front and the rear axle assemblies which may be mounted on the vehicle frame (not shown) in any suitable manner; $D^2$ designates, generally, a transmission gear located between the axle assemblies $B^1$ and $B^2$ and to which power may be supplied from a motor (not shown) mounted at any suitable point; and $F^2$, $F^3$ designate drive shafts extending from the transmission gear $D^2$ to the front and rear axle assemblies, respectively.

As distinguished from the axle assemblies B, B' shown in Fig. 1, the axle assemblies $B^1$, $B^2$ are of the beam type. That is to say, each axle assembly $B^1$, $B^2$ includes a rigid cross member or beam 19 and, in addition, a casing 20 which houses a differential gearing 21, a drive pinion 22 in driving relationship to said differential gearing and shafts 23, 23, extending from said differential gearing to the ends of said casing 20 where they are provided with pinions 24.

The casing 20 may be formed either integrally with the beam 19 or separate therefrom. In either case, the beam 19 is flanged at its ends, as indicated at 25, and the front and rear wheel units 26 and 27, respectively, are provided with mating flanges 28. Thus, either a front or a rear wheel unit may be bolted to either end of any given axle assembly $B^1$ or $B^2$.

As in the case of the wheel units 15 and 16 of the form of the invention shown in Figs. 1 and 2, the wheel units 26 and 27 may be of any suitable or desired specific construction. Essentially, however, each wheel unit 26, 27 includes not only a flange 28 to mate with and to be bolted or otherwise secured to an axle flange 25, but also a spur gear 29 to mesh with the related pinion 24 when the wheel unit is operatively mounted upon the end of the axle assembly.

The drive shafts $F^2$, $F^3$ are, of course, connected with the pinions 22 of the front and rear axle assemblies, respectively, whereby power is transmitted to the front as well as the rear wheels.

The main parts of the axle assemblies $B^1$, $B^2$, that is to say, the beams 19, the casings 20, the differential gearings 21, the drive pinions 22, the shafts 23 and the pinions 24, are duplicates of each other. Accordingly, said axle assemblies may be used interchangeably and have the same advantages anent simplified and low production, assembly and maintenance costs as the axle assemblies B, B', especially as compared with front and rear axle assemblies of unlike construction.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. In a four-wheel drive motor vehicle chassis, front and rear drive axle assemblies which are substantially identical and interchangeable, each of said axle assemblies comprising a main casing provided at its respective ends with substantially flat flange surfaces which lie substantially vertically, wheel carrying elements respectively provided with substantially flat vertical flange surfaces adapted to register and abut with said casing flange surfaces, said wheel carrying elements being adapted to provide different types of wheel mounting for said front and rear axle assemblies respectively, and attaching means for respectively attaching said casing flange surfaces to said flange surfaces of said wheel carrying elements for rigidly attaching said wheel carrying elements to said axle assemblies.

2. A motor vehicle chassis according to claim 1, said wheel carrying elements for said front axle assembly comprising pivoting steering means for steering the front wheels thereof.

3. A motor vehicle chassis according to claim 1, each of said axle assemblies comprising a crossbeam separate from the casing thereof, and said casing flange surfaces being provided at the ends of said cross-beam.

PAUL WIEBICKE.